United States Patent [19]

Deininger et al.

[11] Patent Number: 4,741,158
[45] Date of Patent: May 3, 1988

[54] CONTROLS FOR DRIVE SYSTEM WITH CONTINUOUSLY ADJUSTABLE DRIVE UNITS

[75] Inventors: Horst Deininger, Horstein/Alzenau; Binio Binev, Sulzbach/Main; Wolfgang Grone, Aschaffenburg, all of Fed. Rep. of Germany

[73] Assignee: Linde Aktiengesellschaft, Wiesbaden, Fed. Rep. of Germany

[21] Appl. No.: 15,937

[22] Filed: Feb. 18, 1987

Related U.S. Application Data

[63] Continuation of Ser. No. 634,121, Jul. 25, 1984, abandoned.

[30] Foreign Application Priority Data

Jul. 26, 1983 [DE] Fed. Rep. of Germany ....... 3326926

[51] Int. Cl.[4] ............................................. F01B 251/00
[52] U.S. Cl. ................................. 60/443; 137/625.23
[58] Field of Search ................ 60/443, 465; 91/497, 91/506; 137/625.23, 625.24; 251/309

[56] References Cited

U.S. PATENT DOCUMENTS

| | | | |
|---|---|---|---|
| 3,045,697 | 7/1962 | Seguenot | 251/209 X |
| 3,185,557 | 5/1965 | Gerber | 91/506 |
| 3,398,530 | 8/1968 | Prevallet et al. | 60/465 X |
| 3,448,578 | 6/1969 | Bojas | 60/443 |
| 3,636,979 | 1/1972 | Kamachi et al. | 137/625.23 |
| 3,771,310 | 11/1973 | Cryder et al. | 60/465 X |
| 3,805,676 | 4/1974 | Hamma et al. | 91/506 |
| 3,850,272 | 11/1974 | Reinecke et al. | 60/465 X |
| 4,167,855 | 9/1979 | Knapp | 60/465 X |
| 4,395,878 | 8/1983 | Morita et al. | 60/465 X |

Primary Examiner—A. Michael Chambers
Assistant Examiner—John C. Fox
Attorney, Agent, or Firm—Buell, Ziesenheim, Beck & Alstadt

[57] ABSTRACT

A control for working machine equipped with a continuously hydraulic drive unit and an adjusting element therefor in which the adjusting element is adjusted by control pressure, which is in turn adjusted by a control pressure adjusting element is provided having at least one restrictor in the control pressure adjusting element and a control pressure modifying element that influences the control pressure connected to the control pressure adjusting element.

28 Claims, 12 Drawing Sheets

CONTROLS FOR DRIVE SYSTEM WITH CONTINUOUSLY ADJUSTABLE DRIVE UNITS

This application is a continuation of our copending application Ser. No. 634,121, filed July 25, 1984, now abandoned.

This invention relates to controls for drive systems with continuously adjustable drive units and particularly to a control for a drive equipped with a hydrostatic drive unit of a working machine such as a fork lift in which the regulating unit of the drive unit is provided with a servo piston capable of sliding in an operating cylinder and the setting of the regulating unit is adjustable by means of a control pressure adjustable by means of a control pressure adjusting element.

Drives with a hydrostatic drive unit, whose setting is determined by a control pressure which can be adjusted by means of a control-pressure adjusting element, are known in themselves (Principles of a Hydrostatic Drive Unit—Construction, Mcde of Operation and Special Applications, in *Linde Berichte aus Technik und Wissenschaft*, No. 42 (1977), and DE-OS No. 30 35 152). However, different controls have been used to date for the drive of fork lifts. On the one hand, the so-called "automotive" controls were used, in which the pressure developed in the flow of a constant pump in front of a restrictor determined the setting of the drive unit. Such controls have the disadvantage that the immediate response of the control is lost, i.e., the operator can no longer determine the travel speed immediately by the pedal position. This shortcoming does not arise in controls in which the pedal position immediately determines the position of the setting member of the hydrostatic drive unit either mechanically or through a servo power-amplifying follow-up control. However, such controls are mechanically relatively expensive.

The invention proposes a control for the drive of a working machine, preferably a commercial vehicle, in particular, a fork lift, which facilitates regulation of the hydrostatic drive unit with the simplest and most cost-favorable means possible and also furnishes favorable possibilities for combination with other controls required on the working machine for other drives or a braking arrangement.

This goal is achieved according to the invention in that the control-pressure adjusting element contains at least one restrictor, preferably a chain of two series-connected restrictors, and that an additional control pressure-influencing element is connected to the control-pressure adjusting element, preferably connected in front of it, so that a cost-favorable regulating unit that is easy to produce is obtained for regulating the control pressure, which also operates with a low flow loss and, on the other hand, other devices can be favorably combined with it, in particular, a power-limiting device, which prevents an excessive loading of the primary energy source and thus a suppression of its r.p.m. and a brake can be favorably combined with it.

A particularly useful embodiment results if the control-pressure adjusting element for the control pressure determining the drive unit setting and a device controlling a braking function and a device determining the direction of output rotation, the direction of travel in a transport drive, are jointly located in the housing of a modulator unit.

A particularly advantageous embodiment for a control pressure-influencing element with two series-connected restrictors results when the control-pressure adjusting element is provided with a rotary slide valve that is rotatably supported in a rotary slide valve borehole of a housing and which has a cavity, in which case the housing has an inlet borehole connected with a pressure medium source and a drain hole connected with a drain line and has a control pressure borehole connected with a line leading to the regulating unit of the drive unit, and where the inlet borehole and the drain hole empty opposite each other into the slide valve borehole and the control pressure line is connected with the cavity of the rotary slide valve and perforations are arranged in the wall of the cavity of the rotary slide valve so that in the neutral position of the rotary slide valve the inlet borehole is completely covered by its wall and the drain hole is at least only partially covered, e.g., is covered up to a negative covering, and with increasing swivelling of the rotary slide valve one of the perforations, together with the mouth of the inlet borehole, forms a restrictor, i.e., a restrictor that throttles the inflow to the cavity in the rotary slide mouth of the drain hole, forms a second restrictor, through which the drainage from the cavity inside of the rotary slide valve is throttled, whereby this second perforation, which collaborates with the mouth of the drain hole, is completely closed in the end swivelling position of the rotary slide valve, in which case the perforation collaborating with the mouth of the inlet borehole lies in front of the full width of the mouth of the inlet borehole in this end swivelling position of the rotary slide valve. That is, in the one swivelling state, in which the control pressure is to assume its minimum value, the cavity inside the rotary slide valve is completely separated from the inlet borehole, but the cavity is connected with the drain hole, so that the cavity is relieved of pressure, but no control oil flows. In the other extreme position the mouth of the drain hole is closed, so that no control oil flows in this extreme position either. It is thus achieved that the energy loss that results when the control oil flows off is minimized, although the control function in itself is induced by a throttling action.

The rotary slide valve is connected with an arbitrarily adjustable actuating element, preferably a pedal for r.p.m. selection, travel speed selection in a transport drive.

An additional expedient embodiment for this is one in which perforations are provided in the wall of the cavity of the rotary slide valve so that in the neutral position the inlet borehole is completely covered by its wall and the drain hole is only partially covered and with increased swivelling of the rotary slide valve one of the perforations together with the mouth of the inlet borehole forms a restrictor and a second perforation together with the mouth of the drain hole forms a second restrictor. At least one of the perforations has a shape such that the course of the control pressure over the angle of rotation has a preselected function, preferably so that in the vicinity of the neutral position of the rotary slide valve, its swivelling leaves the control pressure at zero value, in an adjacent zone a swivelling of about 1° effects a sharp rise in control pressure up to a certain slight minimum level and an additional region connects to it, in which a swivelling of about 1° effects only a slight rise in control pressure and in the region of the rotation angle of the slide valve adjacent the end zone of the rotation angle of the rotary slide valve a rotation of about 1° effects a sharp rise in control pressure. By selection of the shape of the perforations, the dependence of the control pressure on the angle of twist and thus on the position of the actuating element, preferably the travel pedal, can be arbitrarily selected, e.g., so that in a narrow range around the neutral position the control pressure can be kept equal to zero due to a sufficiently great positive covering of the rotary slide valve in front of the mouth of the inlet borehole, so that slight deviations in the transmission rods between the actuating element and the rotary slide valve do not result in a control pressure build-up. After actuation, however, a minimum control pressure is to be built up as quickly as possible; it matches the minimum response pressure in the hydraulic adjusting elements of the drive unit, i.e., the spring pretension in the latter is correspondingly designed. However, as soon as a response is obtained, the control pressure is to increase only as little as possible with a further displacement of the actuator by one unit, e.g., a displacement by 1 cm or a swivelling by 1°, because a very sensitive control is to be facilitated precisely at small r.p.m.'s or low travel speeds. Beyond this region in which a very sensitive control is required, the control pressure is to rise more sharply with a further displacement by one unit because such sensitive control is no longer necessary at higher r.p.m.'s or travel speeds.

It is advantageous if the wall thickness of the rotary slide valve is small, at least in the region of the perforation and/or the perforations are sharp-edged and/or the free passage cross section of the perforations in the wall of the rotary slide valve are dimensioned so that the flow is turbulent in them. As a result of the slight wall thickness, the dependences of the control pressure on the viscosity and thus on the temperature are eliminated or at least reduced. For this purpose, it is also possible, if a slight wall thickness is impossible on the whole, to make the perforations conical, where the narrower portion faces outward, at least on a portion of the wall thickness. The size of the free passage cross section of the perforations is selected so that the flow of the control pressure medium inside of the perforations is always in the turbulent range, i.e., with a supercritical Reynolds number. A sharp-edged design of the perforations also serves to avoid discontinuities in the path of the characteristic curve that characterizes the dependence of the control pressure on the angle of twist.

The drain restrictor is increasingly closed with increasing opening of the inlet restrictor, and vice versa, due to the arrangement of the two restrictors on the same rotary slide valve. The two series-connected restrictors represent in principle a hydraulic potentiometer with a center tap, where the resistance on one side of the tap is decreased when the resistance on the other side is increased.

It can be advantageous to arrange two pairs of such restrictors on either side of the neutral position so that one pair is active when the rotary slide valve is displaced out of the neutral position in one direction of rotation and the other pair is active during displacement in the other direction of rotation. This is particularly expedient when a direction-switching slide valve is subsequently connected, one that is automatically switched as a function of the rotation of the rotary slide valve in one or the other direction. It is possible here to design the two pairs of restrictors symmetrically. However, it is also conceivable to choose a different design so that a different characteristic curve of the control pressure results with one direction of output rotation than in the other direction, e.g., so that with a travel drive for backing up the range of particularly sensitive control for low travel speeds is greater than for going forward.

It is particularly advantageous if a pressure-reducing throttling element connected with the drain line is located between the inlet line connected with the control pressure medium source and the inlet borehole in the housing that empties into the slide valve borehole, as a second control pressure-influencing element; the inlet pressure can be arbitrarily reduced by actuating it. By such a reduction in the inlet pressure, the control pressure can be arbitrarily influenced in the direction of reduction and only in this direction, independently of the rotational position of the rotary slide valve. That is, in a travel drive, for example, a reduction in the output r.p.m. and thus the travel speed, i.e., a braking process, can be controlled by actuating this pressure-reducing throttling element, independently of how the travel pedal is set. For this purpose, this superposed pressure-reducing throttling element can be connected with a particular actuator, in particular, a special brake pedal. This offers a very favorable solution with regard to safety because when the brake pedal is actuated, the braking action, i.e., the reduction of the hydrostatic drive unit to a lower output r.p.m., is achieved independently of whether the travel pedal is also deliberately or inadvertently actuated or the rotary slide valve connected with it is still in a position that is different than the neutral setting.

This additional pressure-reducing element can be provided with a rotary slide valve whose form coincides with that of the rotary slide valve of the control pressure adjusting element, i.e., that the same rotary slide valve can be produced in a correspondingly large number and be used inside of the control pressure adjusting element and an additional coinciding rotary slide valve is used in the pressure-reducing control element.

The two rotary slide valves can even be arranged coaxially in a common borehole. This again calls for a low expenditure for production because both rotary slide valves have the same outside diameter within the admissible tolerances and they also fit in the same borehole, and it is easier and cheaper to produce a borehole that passes through than two separate boreholes. Furthermore, the two parts are favorably located alongside each other in a common housing and the connection can be produced in a more favorable manner.

Many drives are provided with a mechanical friction brake that is loaded in the closed position with an energy accumulator, preferably a spring, and is lifted by applying an auxiliary energy, so that if pressure oil is arbitrarily fed in, the brake is released, while if pressure medium is absent, the brake is automatically applied. That is a usual application, for example, on railways and in lifting units. Its application in fork lifts is of course not yet known, but also appears to be advantageous. In a drive with such a brake it is particularly expedient if a branch line branches off from the connecting line between the pressure-reducing throttling element and the control pressure adjusting element and leads to the pressure chamber in the brake cylinder of this said friction brake, so that if the full pressure flows to the control pressure adjusting element, the brake is released, but if the control pressure is reduced by the pressure-reducing throttling element and thus only a diminished control pressure flows to the control pressure adjusting element, the pressure chamber of the brake cylinder is immediately relieved and the mechanical brake is thus brought into action, as a function of the degree of pressure drop. A circuit scheme in which the control pressure for a drive unit simultaneously loads the pressure chamber in the brake cylinder in a travel drive of a vehicle has already been proposed for the hydrostatic drive unit of a travel drive with differential speed steering by the German patent application No. P 32 41 793.4.

In connection with the possibility of installing two pairs of restrictors in the rotary slide valve, the possibility of connecting a reversal switch dependent on the rotational position of the rotary slide valve in active connection with the rotary slide valve has already been mentioned. It is particularly expedient if this direction switch is integrated directly into the rotary slide valve.

It must be considered here that a control according to the invention can be used, e.g., in a scoop loader for regulating the travel drive equipped with a hydrostatic drive unit and a second control of the same type can be used for regulating the hydrostatic drive unit that consists of a pump driven by the internal combustion engine and a cylinder-piston unit for the lift mechanism.

In a modulator unit in which at least two rotary slide valves according to the invention are installed, it is expedient if a valve that switches as a function of the pressure is located between the two signal lines according to another step of the invention; the outlet of this valve is then connected with an additional signal pressure line so that the higher pressure signal is always present in this additional signal pressure line. In the case of a specially designed regulating unit with two rotary slide valves controlled by a common actuating lever it has already been proposed in patent application No. P 33 13 978.4 to install both rotary slide valves in a common borehole.

As already mentioned, the changeover valve that switches as a function of pressure causes the pressure signal at the higher pressure to be always switched to the additional pressure signal line. Now there are control processes with two pairs of signal lines where in the case of one pair the higher signal pressure is to be always present in the additional signal line, but of the other pair only the pressure from the one line is to be always drawn upon as the reference pressure. For example, in lifting hydraulics it may be necessary to be always able to switch the pressure signal for the lifting process to the additional pressure signal line if it is higher than the other pressure signal, but not the pressure signal that controls the lowering, which works opposite the lifting process.

It is already known to allow the control pressure that acts on the adjusting element of the hydrostatic drive unit that is driven by the primary energy source to act on the primary energy source also, for regulating the power-adjusting element of this primary energy source, for a drive with a primary energy source, preferably an internal combustion engine whose power-adjusting element can be regulated by means of an operating cylinder-servo piston unit that can be loaded with control pressure (DE-OS No. 30 35 152). In a particularly expedient further embodiment of the present invention it is provided that the said additional signal pressure line be connected to the operating cylinder-servo piston unit that is connected with the power-adjusting element of the primary energy source.

Through selection of the spring pretensions the characteristics can be influenced, i.e., the sequence and the degree to which the primary energy source is adjusted to a higher power output and the drive unit is regulated with a further actuation of the actuator, in particular, the pressing of the travel pedal. This characteristic deviates from the characteristic usually used to date (see "Fundamentals of Hydrostatic Drives—Construction, Mode of Operation, and Special Uses" in *Linde Berichte aus Technik und Wissenschaft*, No. 42/1977). However, a similar characteristic has already been used for the special case of the drive in which the primary energy source is a d.c. shunt-wound electric motor (DE-OS No. 24 16 363). In connection with the new control according to the invention, the use of a new characteristic is also proposed, where this characteristic is determined by the choice of the spring pretensions at the servo piston of the power-adjusting element of the internal combustion engine and at the servo piston of the hydrostatic drive unit, such that at a low control pressure the combustion engine is raised from the idling r.p.m. to a relatively low working r.p.m., but one that is sufficient for the internal combustion engine to deliver an adequate torque. A Diesel engine is preferably provided as the primary energy source, in which the path of the torque has a flat dome-like course over the r.p.m., beginning from an ascending branch. When the control pressure is raised to the minimum value, the r.p.m. is then first brought to the value in which the power-adjusting element of the Diesel engine is brought from the idling position to a point at which the torque is already somewhat higher than the torque at the maximum r.p.m. Now if the torque load of the Diesel engine increases, more fuel is automatically injected by the speed regulating device and a greater torque is thus produced. Only if the control pressure has risen so high that the hydrostatic drive unit has reached its end position for the maximum output r.p.m. will the power-adjusting element of the internal combustion engine be adjusted to a higher power and thus r.p.m. That is, at low-to-medium output r.p.m.'s only the drive unit will first be regulated, while the internal combustion engine remains at a lower r.p.m. and thus generates little noise and is more favorable in efficiency and exhaust gas composition. Furthermore, the mechanical and splash losses in the hydrostatic drive unit are more favorable at these low r.p.m.'s. Only if the drive unit has reached its end position, will a further rise in the output r.p.m. be induced by adjusting the internal combustion engine to a higher r.p.m. with a further increase in the control pressure. However, it is also possible to use any other characteristic, especially the one used to date, in the arrangement according to the invention. On the other hand, the use of such a characteristic, i.e., such a process or such a choice of dimensions, especially of the spring forces and pretension, is not limited to application in a modulator unit with rotary slide valves according to the invention.

In a drive with an internal combustion engine and with a hydrostatic drive unit regulated by control pressure, the lowering of the control pressure in the case of a drop in the output r.p.m. of the internal combustion engine is also already known (DE-PS No. 20 01 701). Such a regulation can also be advantageously used in the control according to the present invention. However, a lowering of the control pressure if the high pressure of the drive unit exceeds a prescribed boundary value is also known (DE-OS No. 23 27 257). Such a process can also be conveniently used in a control according to the invention. A particularly expedient embodiment for such a power-limiting valve is indicated in claim 20. The control pressure is reduced by this valve as a function of the high pressure present in the drive unit. An overloading of the primary energy source is thus avoided. In a drive, especially a travel drive, in which the hydrostatic drive unit operates in closed circuit, an admissible maximum value can be reached not only during acceleration or uphill travel, but also during braking with respect to the high pressure in the drive unit. During braking, however, this drop in the control pressure is not to take place as a function of the high pressure of the drive unit because there is no danger of the primary energy source becoming overloaded during braking; on the other hand, the drive unit setting for regulating the braking process is to be arbitrarily selectable. For this purpose, it can be provided for only one valve to be present, which is connected through a changeover valve that switches as a function of pressure and which is also expediently determined by the choice of the side on which the higher control pressure prevails (DE-PS No. 32 28 360.1). However, it can also be provided that such a power-limiting device be installed for each of the two controls. Due to the fact that the high pressure and the control pressure act on the same side, it is thus achieved that this power-limiting device does not respond either if the correlation between control pressure and drive unit high pressure is present, at which there is not to be a back-regulation.

Controls for hydrostatic drive units are also already known, in which the control pressure acts on a servo valve piston which controls the inflow and outflow from the operating cylinder and on which a spring force, which is dependent on the position of the final control element of the hydrostatic pump, acts, in which case a power balance sets in between the force generated by the control pressure and the spring force, so that when the forces of the control pressure and the spring are identical, the valve piston holds the inlet and outlet lines of the operating cylinder closed (DE-OS No. 19 55 926). Adjustable axial piston pumps in swash plate construction, in which the adjustable element is a so-called "rocker", i.e., a semicircular cylindrical body on whose plane surfaces the swash plate is formed and which is swivellably supported with its semicircular cylindrical surface in a matching counter-surface of the housing, are also known as the adjustable unit of a hydrostatic drive unit. In order to be able to conveniently utilize such a regulation in such a swash plate axial piston machine, it is provided according to an additional step of the invention to generate the spring force through a bending bar, which is connected on the one hand with the servo valve piston and on the other with the rocker outside of its swivel axis and which is preferably arranged parallel to the swivel axis.

It can be stated in summarizing that the principle of throttle control with a low-pass filter at a rotary slide valve of the control pressure transmitter is essential to the invention. The combination possibility, e.g., with a brake or with a power-limitation for avoiding an overloading of the primary energy source, as well as a common hydraulic control of the final control element of the hydrostatic drive unit and the multiway valve for an otherwise hydraulic drive (working hydraulics), as for example the lifting hydraulics in a scoop loader, is also essential. A common transmitter for travel and braking is preferably provided here, into which the choice of direction (forward or backward) is preferably also integrated, in addition to the functions of specifying the speed, including the braking. Both actuators with a travel pedal and a second, e.g., manually operated direction-selection lever can be used as actuators for this control pressure transmitter equipped with rotary slide valves. Two pedals can also be advantageously used; they are coupled together for oppositely directed movement. Two pressure valves provided for one direction of travel can be connected with one pedal.

A pickup or transmitter for a travel drive can have the same rotary slide valves as a pickup for other drives, e.g., the lifting hydraulics in a stacker, and a rotary slide valve of completely the same design can also be used for the superposed brake valve.

If the control pressure is to be used not only for regulating the setting of the hydrostatic drive unit, but also for regulating another device, e.g., the power setting of an internal combustion engine or a brake, various solutions are available. For example, the rotary slide valve can be in operative connection with a changeover valve, in which case the switching to a definite direction takes place when the rotary slide valve is actuated and then the speed specification through the variation in the throttle cross section in the low-pass filter. Changeover valves that switch as a function of pressure can also be built in, through which the higher pressure is fed to the pressure signal line that leads to the additional device. The control pressure can also be picked off in front of the direction-changeover device in order to obtain a signal that is independent of direction.

With this control pressure transmitter with a low-pass filter at a rotary slide valve the desired course of the characteristic curve is achieved through the geometric design of the perforations on the rotary slide valve.

In the foregoing general description of our invention we have set out certain objects and advantages of this invention. Other objects and advantages of this invention will be apparent from a consideration of the following description and the accompanying drawings in which:

FIGS. 1a through 1d are plan views of the perforations in the rotary slide valve;

Figure 9:
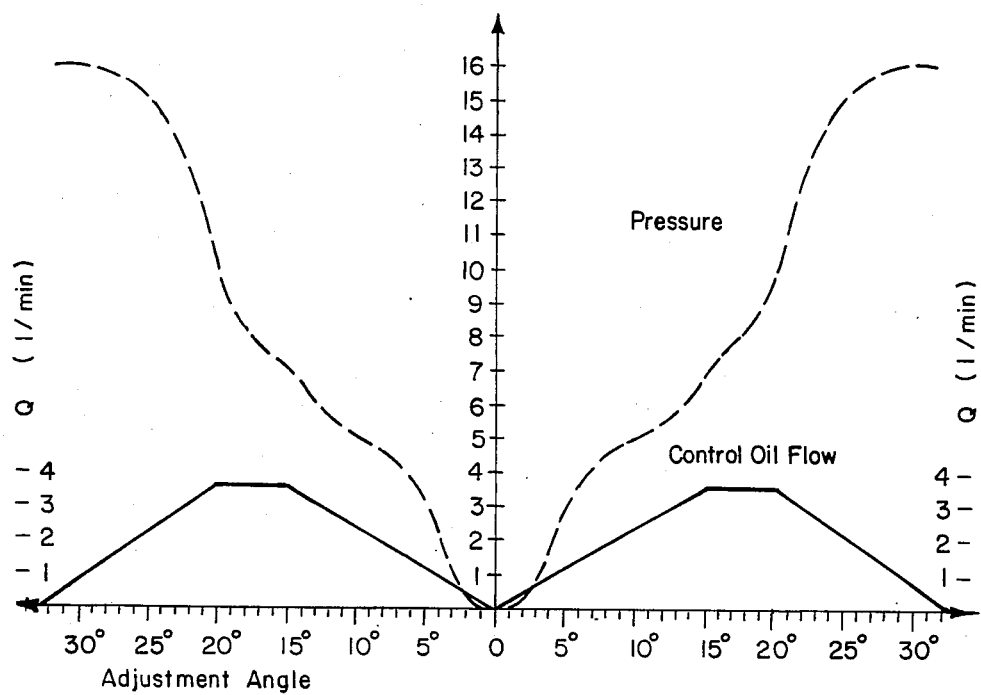
Figure 10:
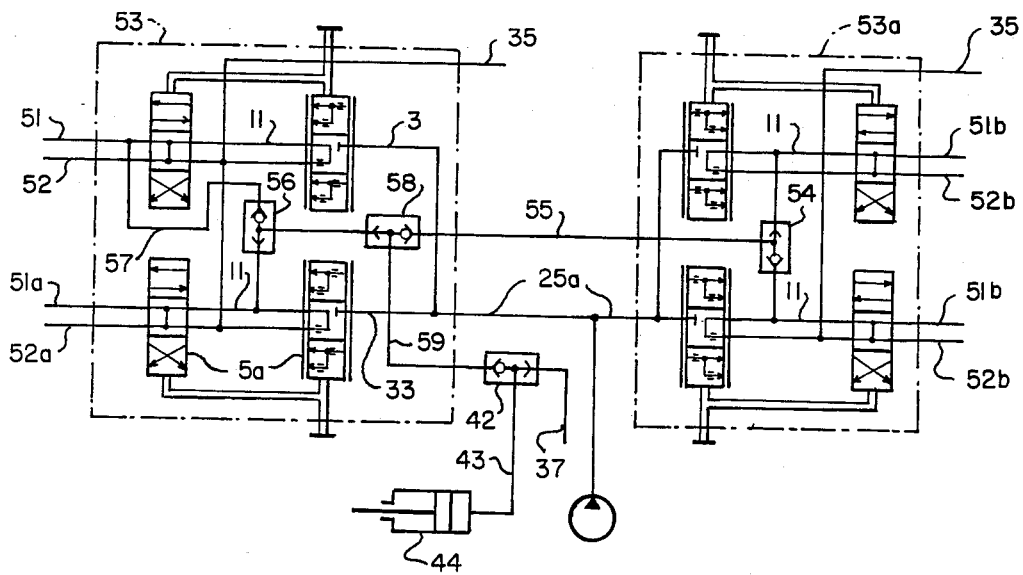
Figure 11:
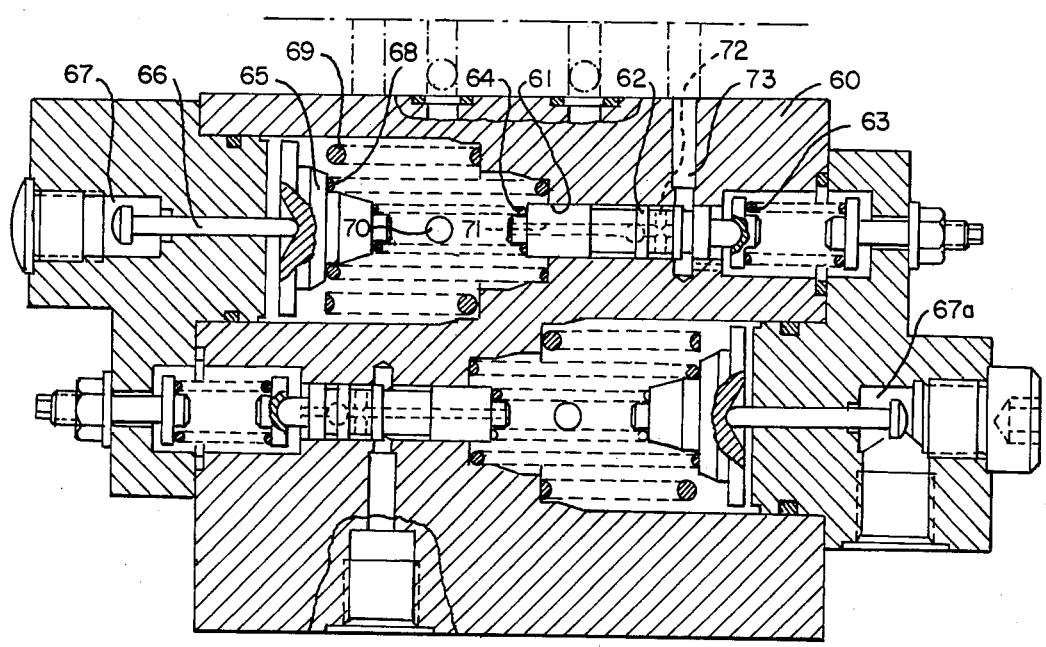
Figure 12:
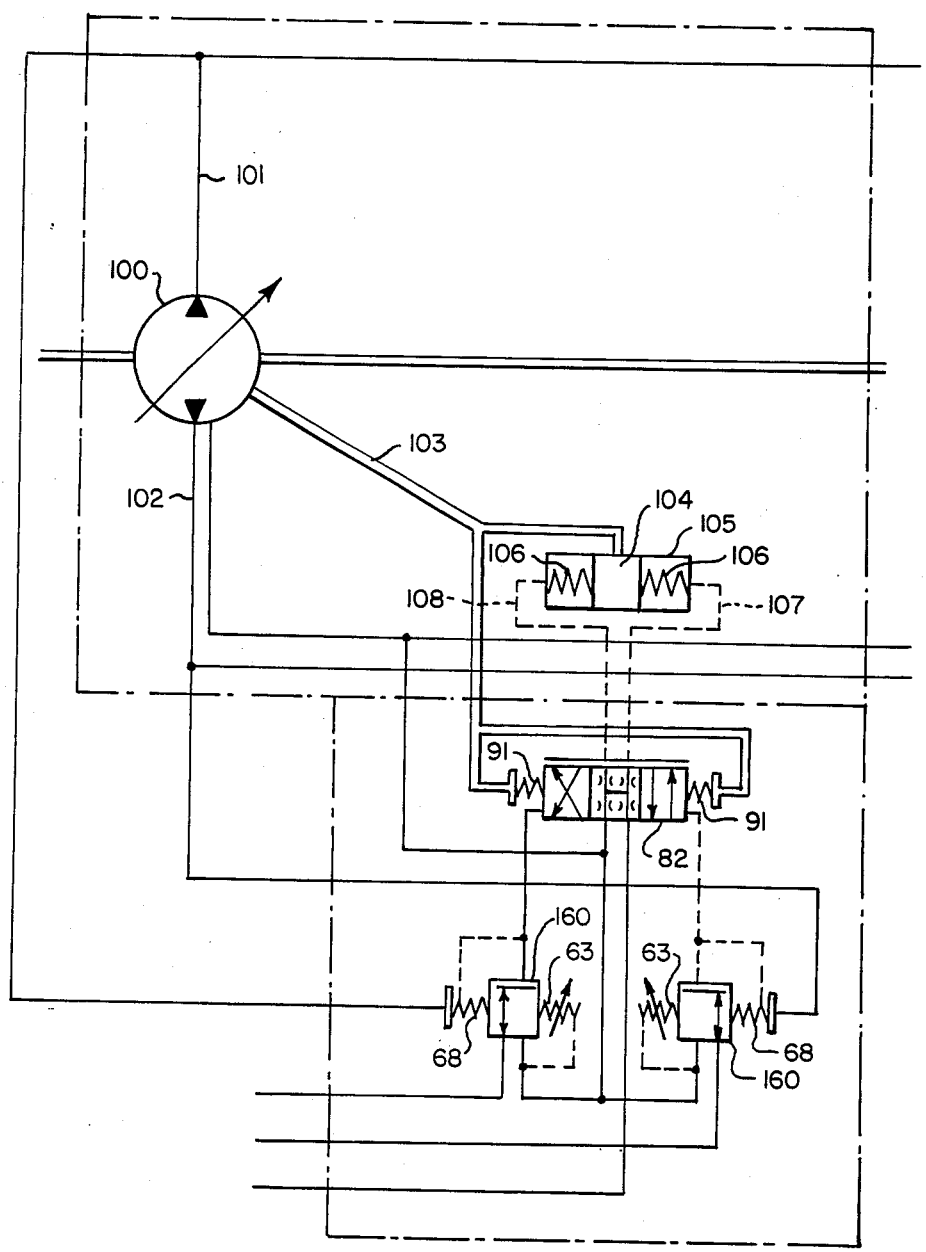
Figure 13:
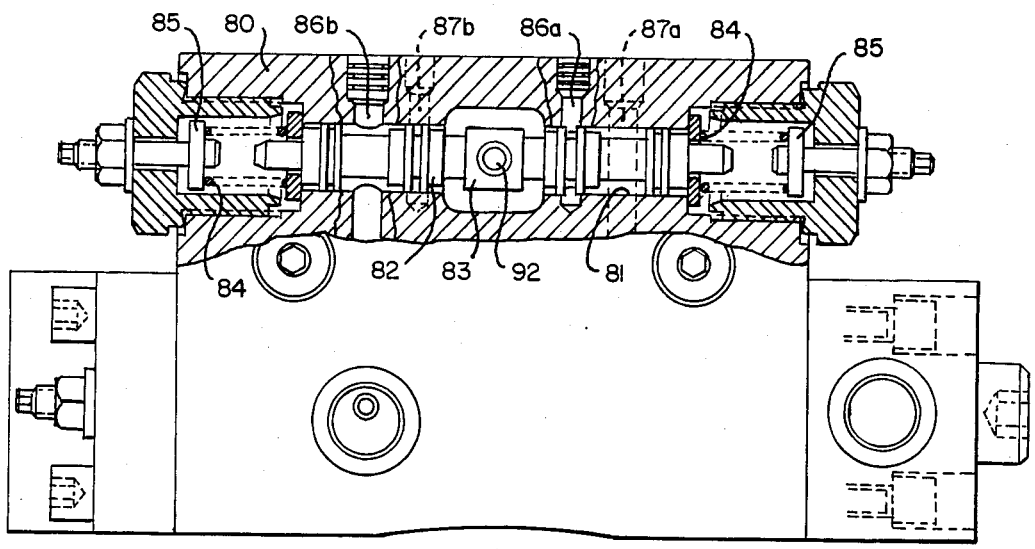
Figure 14:
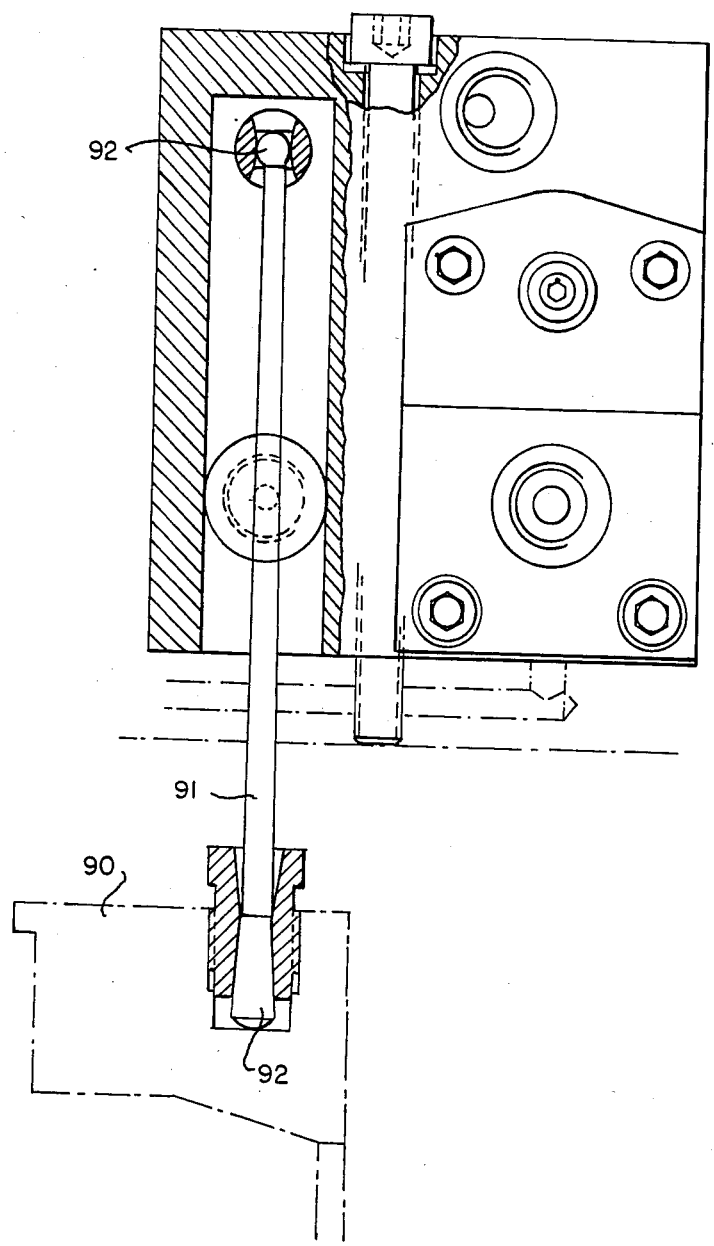
Figure 15:
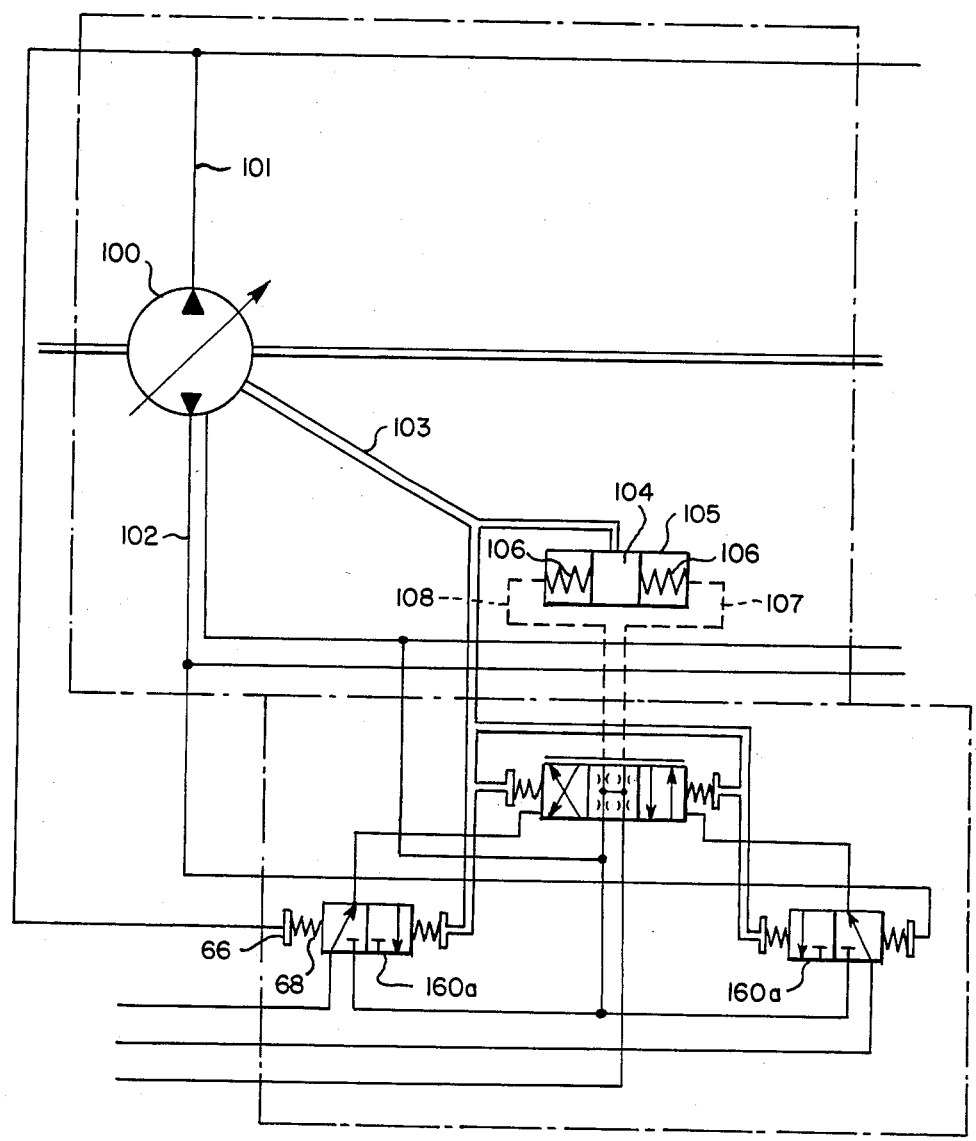

FIG. 9 plots the path of the characteristic curves;

FIG. 10 shows a circuit diagram for picking up an additional control pressure signal;

FIG. 11 shows a device with two high-pressure-dependent power limiters;

FIG. 12 shows a circuit diagram for this;

FIG. 13 shows in cross section a control with power balance;

FIG. 14 shows the bending bar arrangement for this as a plan view on a portion of the control according to FIG. 13; and FIG. 15 shows a circuit diagram for another embodiment.

Referring to the drawings, we have illustrated a rotary slide valve according to the invention having a borehole 2, whose axis runs perpendicular to the plane of the drawing in the housing 1. The mutually coaxial axes of the inlet borehole 3 and the drain hole 4 run in the plane of the drawing. A rotary slide valve that has four perforations 6, 7, 8, and 9 is rotatably supported in the borehole 2. The geometric design of these four perforations 6, 7, 8 and 9 is indicated in tangential section or in radial view alongside the perforation, where FIG. 1a shows a view of perforation 6, FIG. 1b shows a view of perforation 7, FIG. 1c a view of perforation 8 and FIG. 1d shows a view of perforation 9.

A borehole 11, which is connected with the control pressure line, is located in the back wall 10 (as viewed in the line of vision) of the rotary slide valve 5. Between the perforations 6 and 8 there is a wall section 12 of the rotary slide valve 5, which closes the inlet boreholes 3 completely in the neutral position of the rotary slide valve 5 shown in the drawing. Opposite this wall section 12 there is a wall section 13 that is narrower than wall section 12 and covers the drain hole 4 with a negative overlap in the neutral position shown in the drawing.

If the rotary slide valve 5 is turned clockwise, the perforation 6 comes in front of the mouth of the inlet borehole 3 with increasing rotation and the perforation 7 increasingly comes in front of the mouth of the drain hole 4. It is thus possible for a stream of control oil to flow from the inlet borehole 3 through the perforation 6, through the cavity 14 and through the perforation 7 into the drain line 4. A throttling occurs here both at the edge of the inlet borehole 3 and the perforation 6 as well as at the edge of the perforation 7 and the edge of the drain hole 4, with the result that a pressure head develops in the cavity 14 that is lower than the pressure in the inlet borehole 3 and higher than the pressure in the drain hole 4, where the level of this pressure is dependent on the degree of rotation of the rotary slide valve 5. Finally, if the perforation 7 has passed the mouth of the drain hole 4 completely with a further rotation of the rotary slide valve 5, so that the wall section 15 of the rotary slide valve 5 covers the mouth of the drain hole 4 completely, the same pressure prevails in the cavity 14 that is connected through the perforation 6 with the inlet borehole 3 as in the inlet borehole 3.

The geometric shape of the perforations 6, 7, 8 and 9 is selected so that the characteristic curve plotted in FIG. 9 results. The mean control pressure that prevails in the cavity 14 is plotted over the angle of rotation of the rotary slide valve 5 as a dashed curve here. The stream of control pressure medium that flows from the inlet borehole 3 to the drain hole 4 is plotted as a solid line. Because only as much fluid as can enter the pressure chamber in front of the control piston flows through the control pressure borehole 11, the stream in the control pressure borehole 11 can be disregarded; thus, a continuity of the flow on the path of inlet borehole 3, cavity 14 and drain hole 4 can be assumed. In the neutral position shown in FIG. 1 of the drawings, i.e., angle of rotation 0°, the inlet borehole 3 is closed by the wall section 12 and consequently the mean control pressure stream is zero. To the extent that the perforations 6 and 7 increasingly come in front of the mouths of the boreholes 3 and 4, the mean control pressure stream increases until finally the maximum is reached if the perforation 7 lies completely in front of the mouth of the drain hole 4. With a further rotation of the rotary slide valve 5, the runoff through the drain hole 4 is increasingly throttled until the mouth of the drain hole 4 is completely closed off by the wall section 15 of the rotary slide valve 5 and the mean control pressure stream thus again reaches the zero value.

If the rotary slide valve 5 is swivelled out of the neutral position shown in the drawing in the counterclockwise direction, the same functions with respect to the perforations 8 and 9 thus result. The rotary slide valve 5 is rigidly connected with a lever 16.

Besides the range of the rotary slide valve 5, in which the cavity 14 is located, a two-chamber changeover range is provided, in which a wall 17 extending diametrally through the rotary slide valve 5 in the longitudinal plane separates two chambers 18 and 19 from each other. The groove 20 serves to receive an O-ring, not shown.

The rotary slide valve 5-17 is designed as a high-quality cast component.

Figure 5:
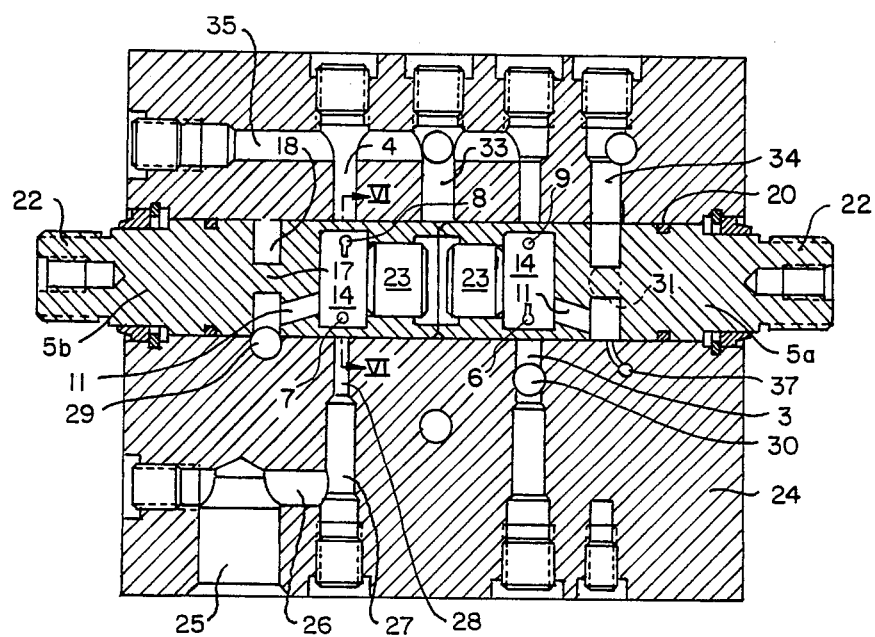
FIG. 5 shows a control pressure-influencing element according to the invention with two rotary slide valves in a common borehole.

The rotary slide valves 5a and 5b in the control pressure-influencing element according to FIG. 5 are both the same as the rotary slide valve 5-16 according to FIGS. 1-4, the only difference being that in the mutually identical rotary slide valves 5a and 5b the lever 16 is not cast with, but must be installed on a connecting part 22, and that the cavity 14 is closed off by a screw cap 23.

Figure 6:
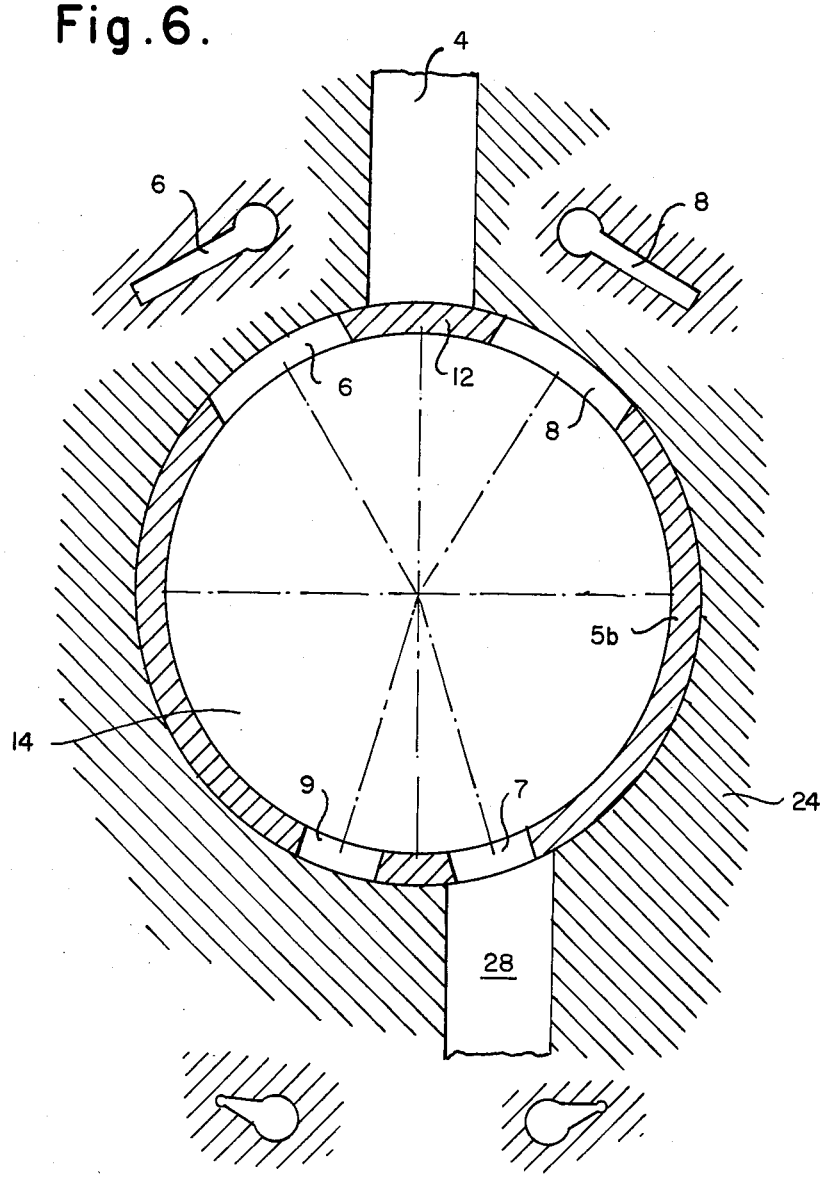
FIG. 6 shows a section through the element according to FIG. 5 along the line VI—VI.

The two rotary slide valves 5a and 5b are installed coaxially to each other in a common borehole of the housing 24. A connection 25 is provided on the latter, to which the inlet line connected with the pressure medium source (not shown in the drawing) is connected. The connector 25 is connected through a borehole 26 and a borehole 27 with the inlet borehole 3. In contrast to the inlet borehole 3, the inlet borehole 28 (as can be seen in FIG. 6) is shifted with respect to the plane in which the axis of rotation of the rotary slide valve 5b and the drain hole 4 lie. Furthermore, the rotary slide valve 5b is installed in the housing so that the inlet borehole 28 is assigned to the perforation 7 and the drain hole is assigned to the perforation 6.

The borehole 29 is connected with the chamber 19 and is connected behind the drawing plane in a manner that is not discernable in the drawing with the borehole 30, which is in turn connected with the inlet borehole 3. A control pressure line borehole 31 is arranged perpendicular to the drawing plane and radial to the axis of rotation of the rotary slide valve 5a, and a second control pressure borehole 32 is installed coaxially to it and symmetrically with respect to the borehole in which the rotary slide valve 5a is capable of rotating.

The borehole 34 is again a drain hole. The borehole 33 serves to relieve the space between the two rotary slide valves 5a and 5b of pressure medium that may be leaking through. The boreholes 4, 33, and 34 are connected through a transverse borehole 35 with a pressureless container.

The rotary slide valve 5a serves to regulate the control pressure for adjusting the hydrostatic drive unit of a travel drive and at the same time for regulating the direction of output rotation.

The rotary slide valve 5b can be swivelled out of the neutral position shown in the drawing in FIG. 6 only in one direction, i.e., clockwise in FIG. 6, and serves to reduce the control pressure for the purpose of braking.

The mode of operation is as follows: control pressure medium flows through the inlet connection 25 and the boreholes 26, 27 and 28 through the perforation 7 into the cavity 14 and from the latter through the borehole 11, the chamber 19, the borehole 29 and the borehole 30. In the neutral position of the rotary slide valve 5b shown in FIG. 6 the inflow of the pressure medium through the perforation 7 is only slightly throttled.

No outflow can take place because the mouth of the drain hole 4 is completely covered by the wall section 12, i.e., the full control pressure medium flow that is fed through the connection 25 flows through the borehole 29 to the borehole 30. If the rotary slide valve 5b is swivelled clockwise, the perforation 7 is partially covered by the edge of the mouth of the inlet borehole 28 and is thus throttled at the mouth of the inlet borehole 8 by the perforation 7. At the same time, one edge of the perforation 6 has come under the mouth of the drain hole 4 so that control pressure medium can flow out from the cavity 14 in a throttled manner here. In this case, the pressure in the cavity 14 is thus no longer identical to the pressure in the inlet borehole 18, but is diminished with respect to it, until finally the inlet borehole 28 is completely shut off.

From the borehole 30 and the inlet borehole 3 the pressure medium flows in the manner described in connection with FIG. 1 in a throttled degree as a function of the rotation angle of the rotary slide valve 5a into the cavity 14 and from the latter through the borehole 11 into the chamber 19. Because the wall 17 is thinner than the diameter of the control pressure boreholes 31 and 32, the chamber 19 is connected with the two control pressure boreholes 31 and 32 in the neutral position of the rotary slide valve 5a. However, if the rotary slide valve 5a is swivelled so that in FIG. 5 the upper part moves behind the plane of the drawing, the wall 17 is rotated so that it connects the control pressure borehole 31 through the chamber 18 with the drain hole 34 and on the other side of the wall 17 it connects the control pressure borehole 32 with the chamber 19, which is connected through the borehole 11 with the cavity 14. If the rotary slide valve 5a is rotated in the opposite direction, the chamber 19 becomes connected with the control pressure borehole 31 and the control pressure borehole 32 with the drain hole 34. The direction in which the rotary slide valve 5a is rotated thus determines which of the two control pressure boreholes 31 and 32 is connected with the cavity 14. Because each of the two control pressure boreholes 31 and 32 leads to an adjustment direction of the hydrostatic drive unit that is assigned to a direction of output rotation, the direction of output rotation of the drive unit and thus the direction of travel of the vehicle is simultaneously determined by means of the chamber sections 17, 18 and 19 of the rotary slide valve 5.

The mode of operation is further set out in the following description with reference to the circuit diagram in FIG. 7. The control pressure medium fed in flows through the line 28 to the rotary slide valve 5b, which is assigned to the braking function and thus has the job of lowering the control pressure when it is actuated, independently of the position in which the rotary slide valve 5a is. In the position shown in the drawing the rotary slide valve 5b connects the line 28 unthrottled with the line 29, while the drain line 4 is closed off. With increasing rotation of the rotary slide valve 5b, it produces a throttled connection between the lines 28 and 4 and at the same time throttled the connection to the line 29 until finally the line 29 is shut off in the extreme state and there is only a throttled connection between the boreholes 28 and 4.

A brake control line 36 branches off of the line 29, 30 and leads to the brake cylinder 38, in which a brake piston 39 is capable of moving against the force of a spring 40. The piston 39 is connected with a brake 41, which is closed under the action of the force of spring 40. If the cylinder 38 is under control pressure through the line 36, the piston 39 is shifted against the force of the spring 40 and the brake 41 is thus released. That is, if the full control pressure flows through the lines 29, 30, the brake 40 is released, but if the control pressure is reduced, the brake 41 is increasingly applied.

The line 31 leads to the servo piston of the adjuster of the hydrostatic drive unit regulated by the control and the line 32 leads to the servo piston that controls the inflow to the second side of the operating cylinder, i.e., the drive unit can be regulated only with regard to an output r.p.m. if control pressure is present in one of the two control pressure lines 31 or 32, in which case the direction of rotation of the drive unit is dependent on which of the two control pressure lines 31 or 32 carried the control pressure. The upper section of the rotary slide valve 5a in FIG. 7 corresponds to the region 6–15 of the rotary slide valve through which the inlet borehole 30 is closed off in the neutral position shown in the drawing and a throttled connection is produced between the cavity 14, which is connected with the borehole 11, and the drain hole 4. With increasing swivelling out of the neutral position, an increasingly less throttled connection is produced between the boreholes 30 and 11, independently of the direction of rotation, and the connection to the drain hole 4 is increasingly throttled.

Figure 7:
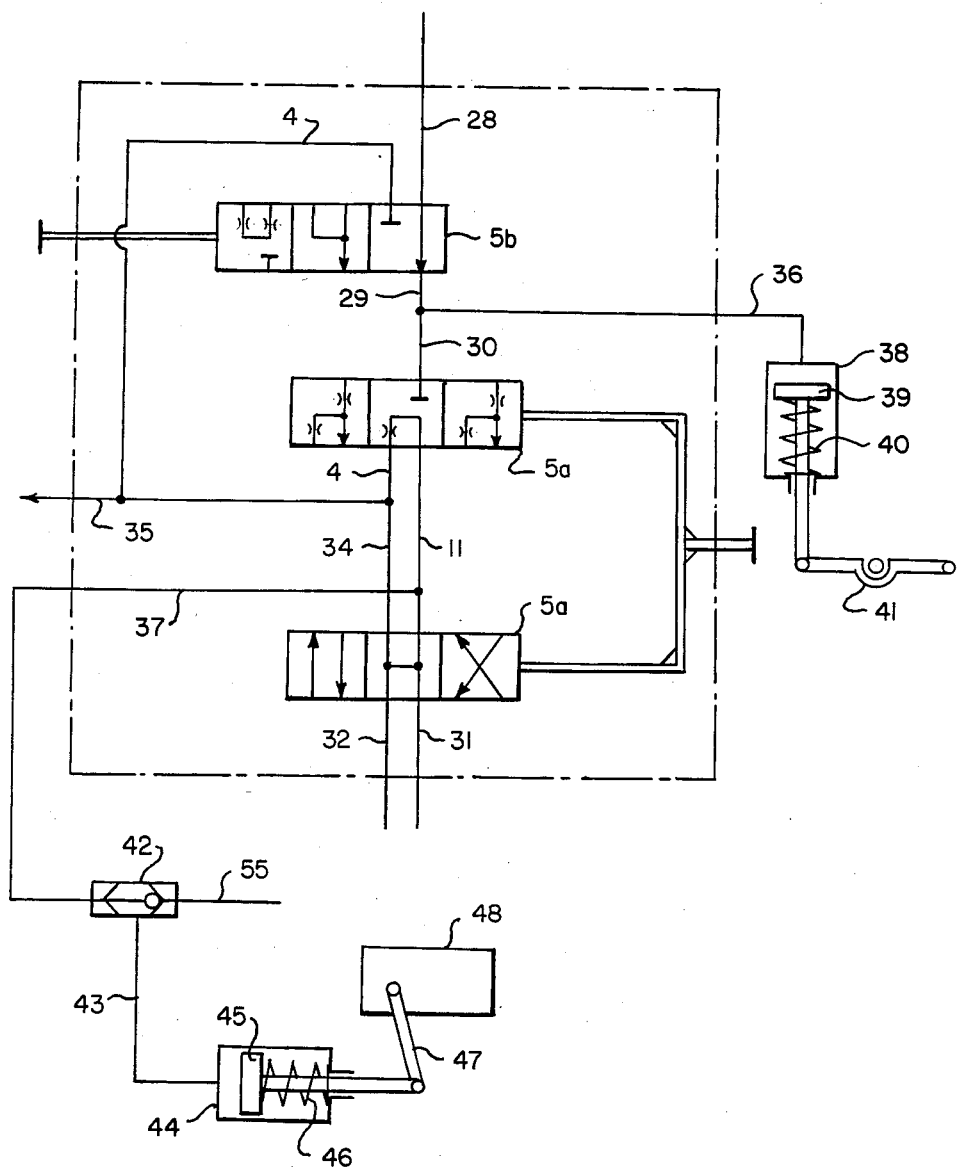
FIG. 7 shows a circuit diagram for the element according to FIG. 5.

The lower section of the rotary slide valve 5a in FIG. 7 represents the chamber changeover zone with the wall 17 and the chambers 18 and 19. As already elucidated in connection with the thickness of the wall 17 and the diameter of the mouths of the control pressure boreholes 31 and 32, an H-switching (main switching) is obtained in the neutral position of the rotary slide valve 5a so that no pressure can build up in any of the control pressure lines 31 and 32 in the neutral position of this valve 5a, because all four connections 11, 31, 32 and 34 are connected with each other. Thus, a pressure cannot build up inadvertently that would result in an undesired movement of the hydrostatic drive unit out of the position assigned to stoppage of the output shaft.

If a control pressure is present in one of the control pressure lines 31 or 32, a control pressure is also present in the line 37, which is fed in through changeover valve 42, which switches as a function of pressure, of a pressure line 43, to which an operating cylinder 44 is connected and in which a servo piston 45 is capable of moving against the force of a spring 46. The servo piston 45 is connected with the switch lever 47 of the adjusting element 48, where the latter controls the r.p.m. of the Diesel engine that drives the hydrostatic drive unit, which is connected to the control pressure lines 31 and 32. In this embodiment the pretension of the spring 46 and the springs in the adjusting elements of the drive unit is selected here so that at zero control pressure the adjusting element 48 is set to the idling r.p.m. of the Diesel engine. If the control pressure increases to the value of 4 bar, the adjusting element 48 is set to an adjustment of up to 1000 r.p.m. in the case of this increase. At this r.p.m. of 1000 the Diesel engine gives a somewhat higher torque than at the maximum r.p.m. If the control pressure rises from 4 to 10 bar, the setting of the adjusting element 48 does not change, i.e., the Diesel engine remains set at 1000 r.p.m. With this increase from 4 to 10 bar, however, the hydrostatic drive unit is adjusted from position assigned to the control pressure of 4 bar with the output r.p.m. of zero up to the maximum conversion to the maximum output r.p.m. assigned to the control pressure of 10 bar. If the control pressure rises above 10 bar, the hydrostatic drive unit remains at this setting for a maximum drive r.p.m. and the adjusting element 48 is shifted up to the maximum output r.p.m. of the Diesel engine (not shown in the drawing).

Figure 8:
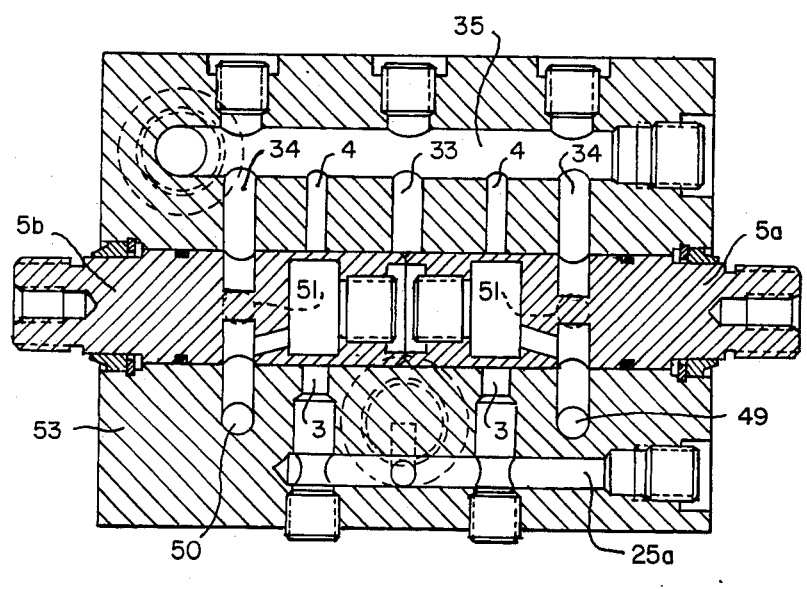
FIG. 8 shows a section through another control pressure-influencing element, namely, one for a working hydraulic system, also with two rotary slide valves in one coaxial borehole.

The control pressure adjusting element shown in FIG. 8 also has two identical rotary slide valves 5a, which are also installed coaxially in a common borehole that passes through in the case of the control pressure-influencing element according to FIG. 8. However, the control pressure-influencing element according to FIG. 8 differs from that according to FIG. 5 in that each rotary slide valve 5a regulates a control pressure line that leads to a device regulated by it (not shown). Each of the control pressure lines preferably serves for regulating a multiway valve, with which a working hydraulic system, e.g., the lifting cylinder of a lifting hydraulic system, is loaded with or relieved of pressure. In the control pressure-influencing element according to FIG. 8 the pressure medium also flows from the connection 25a to the inlet boreholes 3, at the mouths of which it is regulated by the rotary slide valve 5a. In the case of the right-hand rotary slide valve 5a in the drawing a borehole 49 goes from the chamber region 17, 18 and 19 and a borehole 50 passes from the chamber zone 17, 18 and 19 in the left-hand rotary slide valve in the drawing and they thus carry the full control pressure signal. Corresponding to the boreholes 31 and 32, boreholes 51 are provided here; they are not discernable in the drawing because the boreholes 52 lying in front of the drawing plane subtend them.

Figure 1:
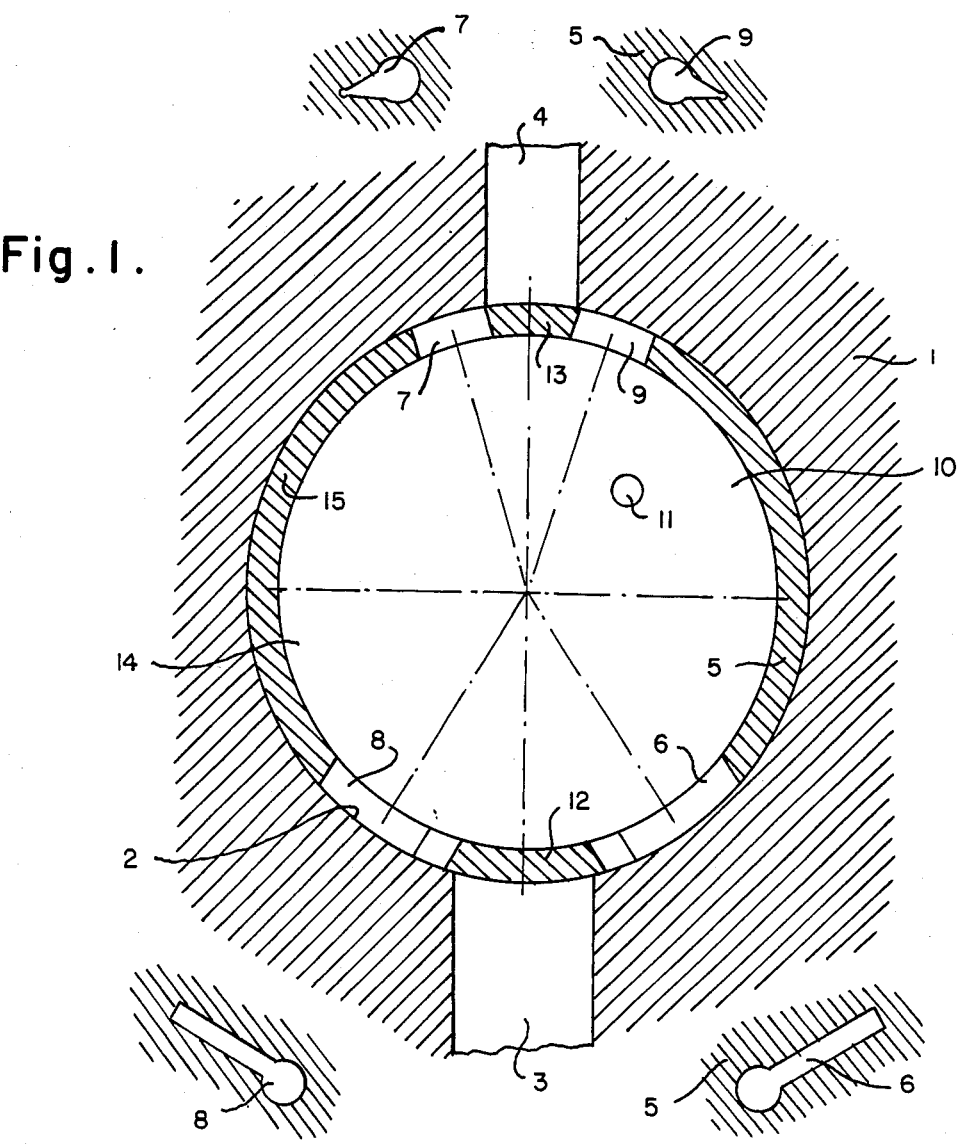
FIG. 1 shows a section normal to the axis of rotation through the cavity zone of a rotary slide valve for a control pressure-influencing element according to the invention.
Figure 2:
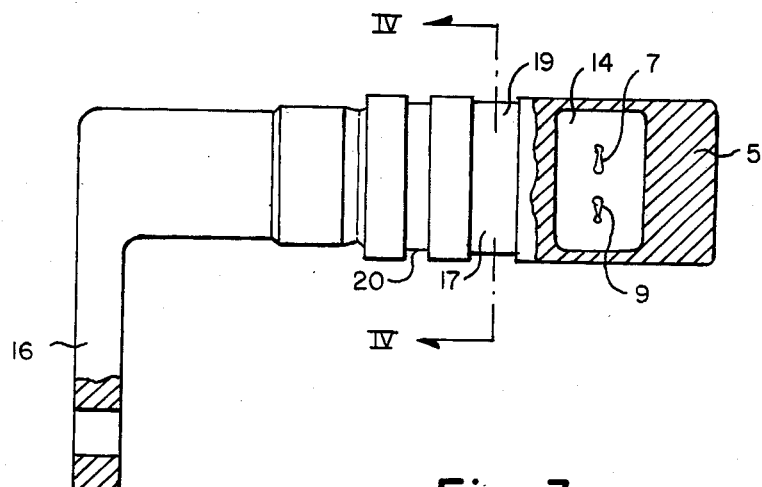
FIG. 2 shows a side view, in partial section, of the same rotary slide valve.
Figure 3:
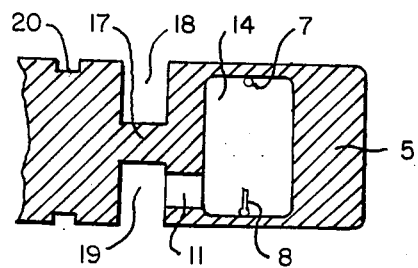
FIG. 3 shows a plan view on a portion of the rotary slide valve according to FIG. 2 (thus, shifted by 90° in direction of sight as compared with FIG. 2)
Figure 4:
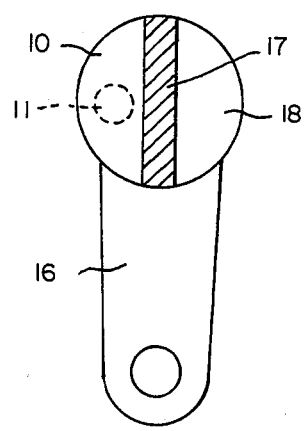
FIG. 4 shows a section along the line IV—IV in FIGS. 2 and 3.

Because the same rotary slide valves are used as in the control pressure-influencing element according to FIG. 1, the characteristic curves according to FIG. 9 are also obtained with the control pressure-influencing element according to FIG. 8.

In the circuit diagram according to FIG. 10 the coupling of two control pressure-influencing elements 53 according to FIG. 8 is presented. The control pressure-influencing element 53 on the left in FIG. 10 serves with its upper rotary slide valve for controlling the raising or lowering of the telescopic jack of a lifting stand of a fork lift, while the lower rotary slide valve 5a in the left-hand control pressure-influencing element 53 in FIG. 10 serves to control the forward or backward tilting, in which case the control pressure lines 51 and 52 lead to a hydraulically controlled multiway valve (not shown), by which the loading of the lifting cylinder with pressure or the release of pressure medium is controlled, while the two control pressure lines 51a and 52a lead to the multiway valve, which effects the loading of the tilting cylinder in one or the other direction.

The right-hand control pressure-influencing element 53a in FIG. 10 serves to control a two-fold additional hydraulic system. In this right-hand control pressure-influencing element 53a in the drawing a changeover valve 54 that switches as a function of pressure is connected to the two lines 11 and its outlet line 55 is connected to the changeover valve 58 which switches as a function of the pressure. In the left-hand control pressure-influencing element 53 in FIG. 10 a changeover valve 56, which switches as a function of pressure, is connected to the connecting line 11 assigned to the lower rotary slide valve in FIG. 10 and a line 57 is connected to its other side, but this line 57 is not connected to the connecting line 11, but to the line 51; that is, the line 57 is not loaded independently of the side to which the rotary slide valve 5a is turned, but is loaded only if the control pressure line 51 is loaded with pressure, but not if the control pressure line 52 is loaded with pressure. This is because the control pressure line 51 effects the lifting, i.e., when the control pressure line 51 is loaded, the internal combustion engine must be switched to an increased power output, while when the control pressure line 52 is loaded, the lowering process is imposed, which proceeds without the supplying of energy by the internal combustion engine. A line 59 departs from the changeover valve 58 that switches as a function of pressure and leads to the changeover valve 42 already described in FIG. 7, from which the line 43 that leads to the operating cylinder 44 of the adjusting element 48 of the internal combustion engine departs.

In the case of the power-limiting element shown in FIG. 11, a borehole 61 is provided in the housing 60 and a two-edged control slide valve 62 is capable of being displaced in it. This valve 62 is supported against an adjusting spring 63 on the one hand and against a spring 64 on the other. The spring 64 is in turn supported against a spring plate 65, which is supported against a high-pressure piston 66, which projects into the pressure chamber 67, which is loaded with the high pressure of the drive unit to be limited by this power limiter with respect to power output. A spring 68 is also continuously in contact against the spring plate 65 at one end and the housing wall of bore hole 71 at the other end and with a sufficient displacement the spring plate 65 engages against the spring 69. Thus the spring plate 65 is always engaged by spring 68, extending between spring plate 65 and the wall of bore hole 71, urging spring plate 65 to the left, viewing FIG. 11. When spring plate 65 moves to the right, under the urging of piston 66, against spring 68 for a pre-fixed distance it engages spring 69 which then coacts with spring 68 to resist further movement to the right viewing FIG. 11. Spring 64 is, in the meantime, continuously engaged between spring plate 65 and valve 62 and acts on valve 62 to reflect the position of spring plate 65. The space in front of the face of the two-edged slide valve 62 is thus loaded with control pressure through the borehole 70. This control pressure also acts on the spring-side face of the piston 66. However, because the control pressure is considerably less than the high pressure, this influence is slight. A connection passes through the axial borehole 71 in the two-edged control slide valve 62 to the transverse borehole 72 and into the annular groove 62a, from which the control pressure medium can flow off from bore hole 71 into the borehole 73 when slide valve 62 is moved to the right, viewing FIG. 11, so that groove 62a is in communication with borehole 73, which connects to drain.

A power limiter that is identical in principle is shown in the lower part of FIG. 11. Its high-pressure chamber 67a is loaded by high pressure in the second line of the hydrostatic drive unit operating in closed circuit.

The control described in FIGS. 12, 13, 14 and with modification 15 has two coaxial boreholes 81 in a housing 80. A valve piston 82 is capable of sliding in these boreholes 81; it has a two-edged slide valve on each side and its middle section is built out into a connection head 83. This valve piston 82 is capable of sliding between two adjustment springs 84, which are each supported against a spring plate 85 adjustable by means of a screw 85a. Each face of the valve piston 82 is loaded by a control pressure and each two-edged slide valve that forms a part of the valve piston 82 regulates the inlow and outflow of pressure medium through the lines 86a and 87a or 86b and 87b, where the line 86a and 86b leads to an operating cylinder (not shown), in which servo pistons (not shown either) are capable of sliding; these servo pistons engage on the rocker 90 of the axial piston machine that is to be regulated. A bending bar 91 is fastened with its head section 92 at a distance from the axis of rotation of the rocker 90 in the latter. The other end of the bending bar 91 projects with a ball head 92 into a borehole of the middle head 83 of the valve piston 82.

The circuit diagram in FIG. 12 shows the adjustable pump of the hydrostatic drive unit, which delivers, depending on the adjustment, either into the feed line 101 or into the feed line 102, which are connected in closed-circuit with a hydraulic motor (not shown). A servo piston 104 is connected with the final control element 103 and it is capable of sliding between two centering springs 106 in an operating cylinder 105. The two pressure chambers in the operating cylinder 105 are loaded with control pressure through the two pressure lines 107 and 108 on both sides of the servo piston 104. This loading is regulated through the valve piston 82. The bending bar 91 is shown in FIG. 12 as the two springs 91a; indeed, the bending bar 91 can be represented as two springs because the bending bar can be pressed through toward both sides elastically, while the two springs in FIG. 12 are represented only as compression springs. The two power-limiting valves 160 are installed in front of the section with the valve piston 82 they correspond to the power-limiters in the housing 60 according to FIG. 11.

In the embodiment according to FIG. 15, the components 82, 90 and 100–108 correspond to those in FIG. 12, with the only difference that instead of the power limiter 160 the power limiters 160a are provided; they in turn are dependent on the setting of the adjusting element 104 with regard to the spring pretension on the side opposite the pressure chamber 67.

In the foregoing specification we have set out certain preferred practices and embodiments of our invention, however, it will be understood that this invention may be otherwise embodied within the scope of the following claims.

We claim:

1. In a control for the drive of a working machine, such as a forklift, equipped with a continuously adjustable hydraulic drive unit, an adjusting element for adjusting said hydraulic drive unit in which the setting of the adjusting element of the drive unit is adjustable by means of a control-pressure, and a first control-pressure adjusting element for adjusting the control-pressure, the improvement comprising at least one restrictor in said first control-pressure adjusting element and a second control-pressure element having at least one restrictor therein connected to the first control-pressure adjusting element acting to influence the control-pressure at the control-pressure at the first adjusting element and wherein the control-pressure adjusting element has two series-connected restrictors in a rotary slide valve that is rotatably supported in a slide valve borehole of a housing, a cavity in said slide valve intermediate the restrictor, an inlet borehole in the housing connected at one end with a source of pressure medium, and at the other with the valve borehole, a drain hole in the housing connected at one end with a drain line and at the other with the valve borehole opposite the inlet borehole, a control-pressure borehole in said housing connected with a line leading to a regulating unit of the drive unit, said inlet borehole and said drain hole lie opposite each other and the control-pressure line is connected with the cavity of the rotary slide valve and perforations are arranged in the wall of the cavity of the rotary slide valve so that in the neutral position of the rotary slide valve the inlet borehole is completely covered by a wall of the slide valve and the drain hole is at least partly covered and with increasing rotation to an end position in one direction of the rotary slide valve one of the perforations, together with the mouth of the inlet borehole forms one of said two series connected restrictors and a second perforation, together with the mouth of the drain hole, forms the second of said series connected restrictors, which second restrictors are completely closed in the rotation end position of the rotary slide valve, and the perforation collaborating with the mouth of the inlet borehole lies in front of the full width of the mouth of the inlet borehole in this swivelling end position of the rotary slide valve.

2. A control according to claim 1 wherein at least one of the perforations has a shape such that the course of the control-pressure over the angle of rotation has a preselected function, preferably so that in the vicinity of the neutral position of the rotary slide valve, its rotation leaves the control-pressure at the zero value, in an adjacent zone a rotation of about 1° effects a sharp rise in the control-pressure up to a certain slight minimum level and an additional region connects to it, in which a rotation of the rotary slide valve of about 1° effects only a slight rise in the control-pressure, and that in the region of the rotation angle of the rotary slide valve adjacent to the end zone of the rotation angle of the rotary slide valve a rotation around 1° effects a sharp rise in the control-pressure.

3. Control according to claim 2 wherein each perforation on the inlet side has an at least approximately circular opening adjacent to the wall section covering the mouth of the inlet borehole in the neutral position of the rotary slide valve and a slit connected to it and running in the tangential direction, for which the mutual spacing of the walls running at least approximately parallel to each other is less than the diameter of the circular opening.

4. Control according to claim 3 wherein the diameter of the circular opening of the perforations on the inlet side is smaller than the diameter of the circular openings of the perforations on the drain side.

5. Control according to claim 2 wherein each perforation on the drain side has an at least approximately circular opening adjacent to the wall section covering the mouth of the drain hole in the neutral position of the rotary slide valve, to which a triangular wedge-shaped section of the perforation connects in the tangential direction.

6. Control according to claim 5 wherein the diameter of the circular opening of the perforations on the inlet side is smaller than the diameter of the circular openings of the perforations on the drain side.

7. A control according to claim 1 wherein two pairs of restrictors are located in series on opposite sides of the rotary valve with the restrictors of each pair on opposite sides of the neutral position.

8. A control according to claim 1 wherein the wall thickness of the rotary slide valve is slight, at least in the region of the perforations.

9. A control according to claim 1 wherein the perforations have a sharp edge.

10. Control according to claim 1 wherein the free passage cross sections of the perforations are dimensioned so that a turbulence is induced in the flow in them.

11. Control according to claim 1 wherein a pressure-reducing throttle element connected with the drain line is located between the inlet line and the inlet borehole as a second control-pressure-influencing element, through the actuation of which the inlet pressure in the inlet borehole can be reduced.

12. Control according to claim 11 wherein the pressure-reducing throttle element is provided with a rotary slide valve, whose form coincides with that of the rotary slide valve of the control-pressure adjusting element.

13. A control according to claim 12 wherein the two rotary slide valves are arranged coaxially to each other in a common borehole.

14. Control according to claim 11 wherein a branch line branches off from the connection line between the pressure-reducing throttle element and the control-pressure adjusting element, which leads to the brake lifting pressure chamber of a mechanical friction brake, which is pressed into the closed position by an energy accumulator and released by loading the pressure chamber.

15. A control according to claim 1 wherein a two-chamber space is located in the rotary slide valve body alongside the cavity whose two chambers are separated from each by a partition passing diametrally through the axis of rotation, in which case one of the chambers is connected through a borehole running at least partially in the axial direction with the cavity in the rotary slide valve and where two control-pressure boreholes are provided, each of which leads to a control-pressure chamber of the regulating unit of the drive unit assigned to one direction of movement and which lie opposite each other such that the wall lies with a negative covering in front of the two mouths of one of the two control-pressure lines in the neutral position of the rotary slide valve, and whereby the chamber not connected with the borehole is connected with the drain line.

16. Control according to claim 15 wherein the two chamber system is connected with the perforations in the wall of the rotary slide valve in the direction of flow behind the cavity of the rotary valve and a signal pressure line is connected between this cavity and the two lines selectively controlled by the two chamber system.

17. A control according to claim 15 wherein the control is used for controlling a working hydraulic system, preferably a cylinder-piston unit of a scoop loader, including a transport drive.

18. Control according to claim 17 having a modulator unit in which at least two rotary slide valves are located, and wherein a valve switching as a function of pressure is located between the two control-pressure lines, whose outlet is connected with an additional signal pressure line.

19. A control according to claim 18 having a modulator unit for two functions with two directions of movement, and wherein, in the case of one function, a pressure-dependent signal is required only for one direction of movement, and the pressure-dependent signal is derived from the control-pressure line that is assigned to the direction of movement for which a pressure-dependent signal is required.

20. Control according to claim 19 for a drive with a primary energy source in the form of an internal-combustion engine, whose power adjusting element can be adjusted by means of an operating cylinder-servo piston unit that can be loaded by control-pressure, wherein the signal pressure line is connected to the operating cylinder-servo piston unit of the power adjusting element of the primary energy source.

21. Control according to claim 20 with an internal-combustion engine as the primary energy source, whereby the servo piston can be displaced against the force of a spring in each operating cylinder under the force of the control-pressure, and wherein the pretension and characteristic curve of the spring, against which the servo piston connected with the power adjusting element of the primary energy source is capable of being displaced, behave with regard to the pretension and characteristic curve of the spring, against which the servo piston of the drive unit adjusting element is supported, so that with a control-pressure rising from zero the adjusting element of the internal combustion engine is first set to an r.p.m. at which the internal combustion engine is capable of furnishing an adequate torque and that the adjusting element of the internal combustion engine can be set to a higher output r.p.m. only at control-pressures that are higher than the control-pressure at which the hydrostatic drive unit has reached its setting for the maximum output r.p.m.

22. Control according to claim 20 wherein a power-limiting device is assigned to the control-pressure line for each of the two control directions departing from the neutral position of the rotary slide valve.

23. A control according to claim 1 wherein the drive unit is a hydrostatic drive unit.

24. A control according to claim 1 wherein said control-pressure adjusting element has two restrictors in series.

25. In a control for the drive of a working machine, such as a forklift, equipped with a continuously adjustable hydraulic drive unit, an adjusting element for adjusting said hydraulic drive unit in which the setting of the adjusting element of the drive unit is adjustable by means of a control-pressure, and a first control-pressure adjusting element for adjusting the control-pressure, the improvement comprising at least one restrictor in said first control-pressure adjusting element and a second control-pressure element having at least one restrictor therein connected to the first control-pressure adjusting element acting to influence the control-pressure at the control-pressure adjusting element and having a drive with a hydrostatic drive unit with a power-limiting device for reducing the control-pressure when a boundary value of the operating pressure in the drive unit is reached, wherein a piston loaded by the operating pressure is supported against two springs in the power-limiting device, one of which is supported against the housing.

26. Control according to claim 25 wherein a fourth spring acts on a portion of the path of the piston loaded by the operating pressure, parallel to the first spring.

27. Control according to claim 25 wherein the two control-pressure lines assigned to one direction of rotation are connected through a switch-over valve to a power-limiting device.

28. A control according to claim 25 wherein the drive unit is a hydrostatic drive unit.

* * * * *

UNITED STATES PATENT AND TRADEMARK OFFICE
CERTIFICATE OF CORRECTION

PATENT NO. : 4,741,158
DATED : May 3, 1988
INVENTOR(S) : Horst Deininger, Binio Binev, and Wolfgang Grone It is certified that error appears in the above-identified patent and that said Letters Patent is hereby corrected as shown below:

Column 2, line 21, after "slide" insert --valve, in which case a second perforation, together with the--.

Signed and Sealed this

Fifteenth Day of November, 1988

Attest:

DONALD J. QUIGG

*Attesting Officer*    *Commissioner of Patents and Trademarks*